Dec. 23, 1952 A. J. LAING 2,622,849
SELECTIVE REFRIGERATION AND HEATING INSTALLATION
Filed Jan. 7, 1946 7 Sheets—Sheet 6

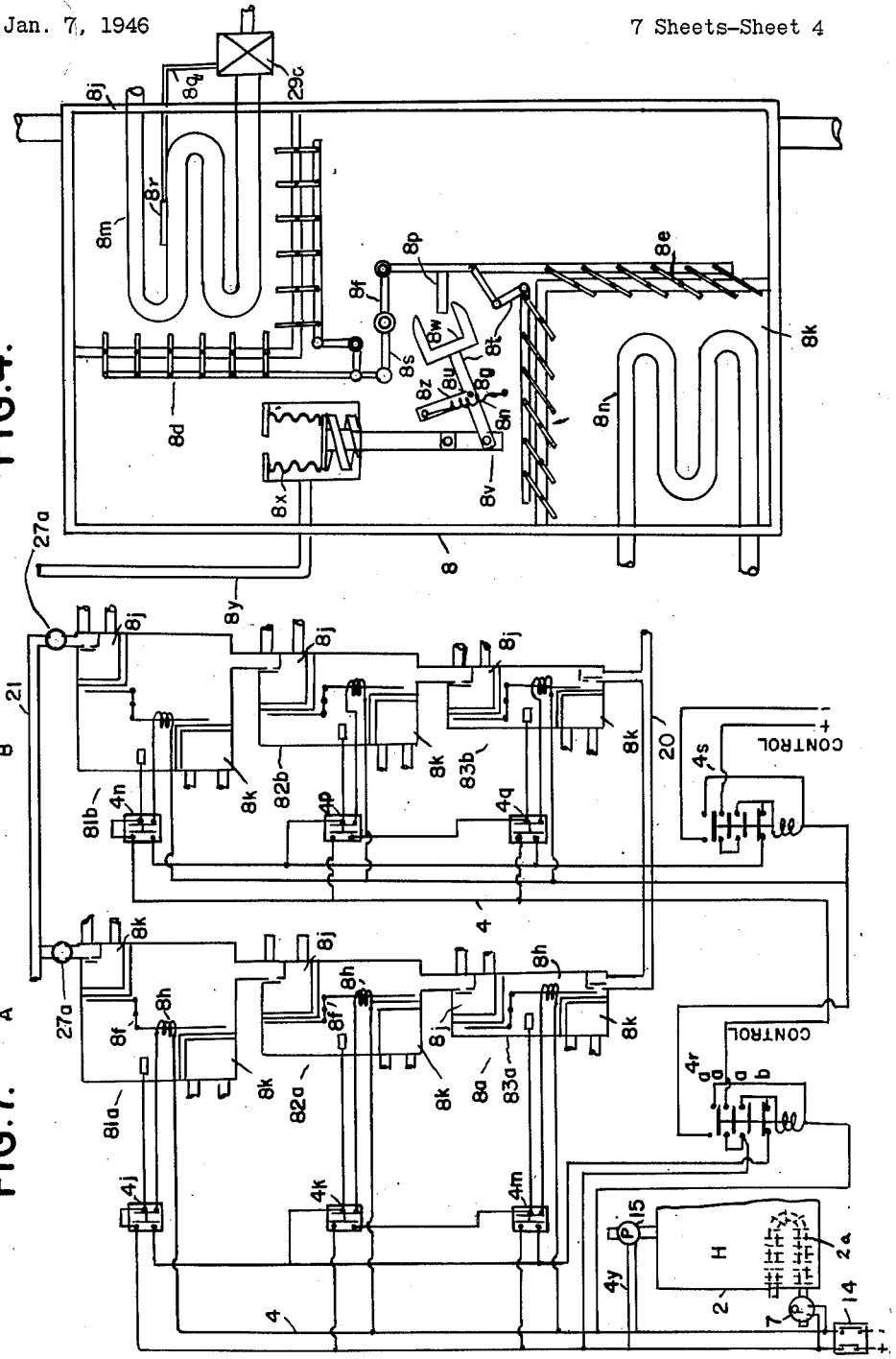

INVENTOR
ARTHUR J. LAING
BY *William M. Swan*
ATTORNEY

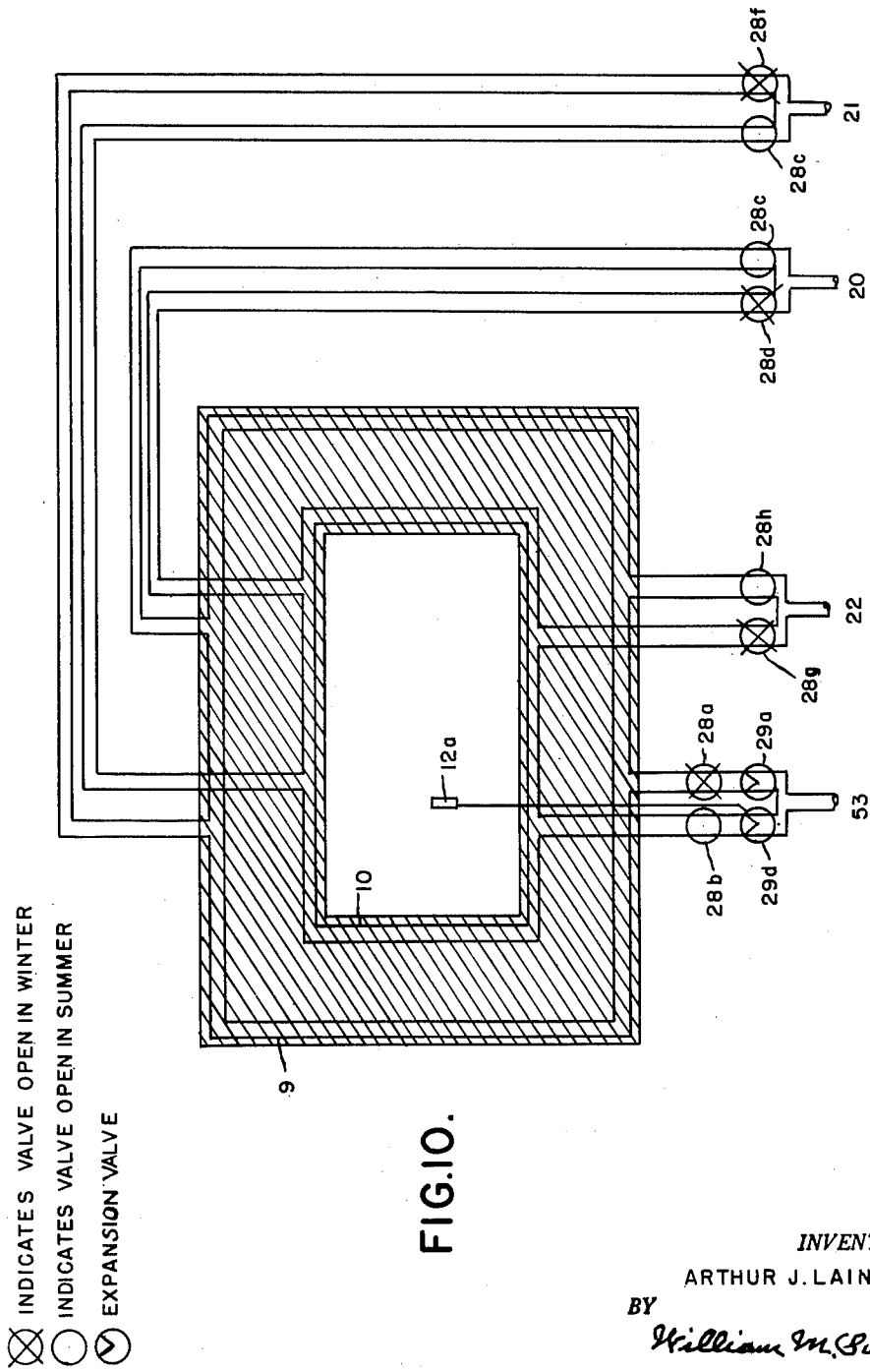

Patented Dec. 23, 1952

2,622,849

UNITED STATES PATENT OFFICE 2,622,849

SELECTIVE REFRIGERATION AND HEATING INSTALLATION

Arthur J. Laing, Detroit, Mich.

Application January 7, 1946, Serial No. 639,685

6 Claims. (Cl. 257—3)

1

This invention relates to a gas-compressive mechanism, and has for its object an interrelated organization of heat exchangers for selectively compressing a system-contained quantity of gas, for the exertion of a heating (or cooling) effect upon a room or equivalent structural unit; and it is generally spoken of as "a reverse-cycle refrigeration system."

Conformably to what is known as "Charles' Law," compression or expansion of the system-contained gas is brought about by the alternated heating and cooling of a contained refrigerant in a series of chambers, which compresses and contracts the contained gas as it is respectively heated or cooled, and traps the differential pressures and advances its movement along the refrigerating cycle, discharging the gas under greater pressure than that at which it is admitted into the series of chambers.

In place of the well-known, mechanical compressor for effecting the compression of a refrigerant to condensing pressure, the desired compression is accomplished by the use of an electrically (or pneumatically) activated multiple breather system, which compresses to a condensing degree, or heatingly expands, the fluid contained within a piping system. Because of the alternated cooling and heating effects imposed upon the chambers, a breathing action is set up therewithin; and the chambers will hereafter, in this disclosure, be referred to as a breather chamber compressor, regardless of how many or how few individual chambers, as hereinafter to be described in detail, may be employed in any particular installation. The controlledly-effected alternation of such operative functions, either heating or cooling of the system-contained gas may be effected by the use of any one of several means, such as for example, a drum switch, solenoids, or the like, and louver-guarded heating elements activated by a selected heating source.

The system is preferably organized to include a plurality of such identical fluid-compressing units, each connected in series with a common supply line to, and a common return line from, the condenser and evaporator units within the building or similar installation to be thermally acted upon, with the activating electrical (or pneumatic) connections and their corresponding breather chamber groups overlappingly arranged as regards the timing of their several phases of operative activity, so that at no time in the operation of the installation as a whole will there be any break in the continuity of either the suction or of the compression influence within the interrelated system as a whole. The activity of the system as a whole, or of any selected thermally-influencing part thereof, may be controlled in any desired manner, as, for example, by a drum switch, or by a series of sequence relays, or by pneumatic control.

2

The closed piping system thus constituted, including the system of breather chambers functioning compressively upon the system-contained heating (or refrigerating) fluid, which will be hereinafter dealt with in detail, is provided, at suitable positions therein, with a series of control valves, some of the gate valve type, some of the check-valve type, and some of the expansion-valve type; the location and function of each of these parts will be dealt with as their neighboring parts are successively described. Indeed, the functioning of this entire alternatable heating (or cooling) system, whether comprising a single set of connected-in-series sequence groups, or a plurality thereof arranged in series and in functioningly parallel relation to one another, might be roughly compared to a dam-controlled river or stream provided with a series of lock units for selectively ferrying vessels either upstream to a dam-held upper level or downstream to a lower level, in that only one gate in any one lock-controlled channel may be opened (or closed) at the same time that the other gate (or gates) may be closed (or opened) at the same time during the "locking" of a vessel therethrough.

In the style of switch which I preferably, though not necessarily, employ, the pull of gravity thereon effects the closure thereof unless the energizing electrical circuit is then active. If the switches are in closed position, the activation of the circuit results in their being drawn to closed position.

In the drawings:

Figure 4 is a similar detail showing of a breather chamber unit, varying from the construction shown in Figure 3 in that a bellows or equivalent pneumatic activating means for the cooling chamber and the heating chamber therein is employed, in place of the solenoid-activated construction shown in Figure 3.

Figure 5 is a diagrammatic view of three suitably connected breather chamber groups, wherein pneumatic control is relied upon to activate them in their proper sequence.

Figure 7 is a diagrammatic view of a pair of breather chamber groups together with their appurtenant activating sequence relays instead of a drum switch being relied upon, designed to bring out the possibility of as many breather chamber groups being added as may be desired with the use of sequence relays.

Figure 10 is a plan view of the layout of the cooling and heating pipe appurtenant to the outer and inner surfaces respectively of the structural unit to be thermally influenced, showing, in connection with its included keying explanation, the opened or closed condition of the several valves shown according to whether the then desired functioning of the apparatus be the cooling or heating of the structural unit.

Figure 8:
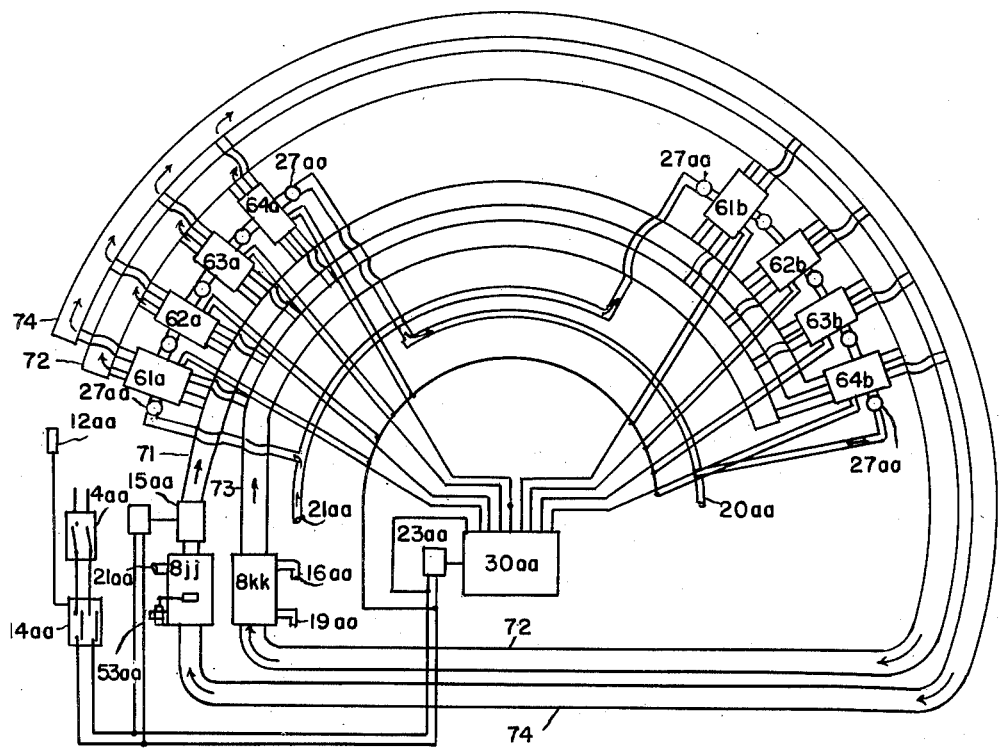
Figure 8 is a diagrammatic showing of a modified form of construction, varying from the construction shown in Figures 1 to 7 inclusive in that the heating or cooling of the piping-contained refrigerant fluid is accomplished at a single central point, whence it is distributed to each of the breather chambers by appropriate outflow and return piping connections.
Figure 9:
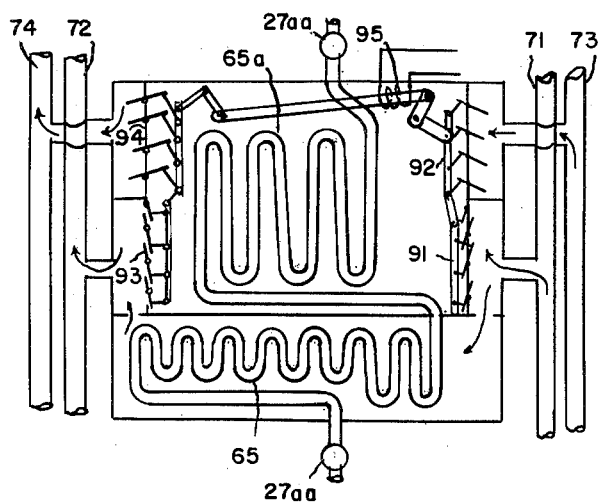
Figure 9 is a larger-scale showing of a single breather chamber and its connections, as made use of in the construction shown in Figure 8.

In the construction illustrated in Figures 1 to 7 inclusive is stressed the heating and cooling of the refrigerant fluid contained within the piping system by means of appropriate thermal-influencing installations in each of the breather chambers, whereas in Figures 8 and 9, similarly diagrammatic in emphasizing the common operative theory underlying the action of the system, there is suggested the possibility of accomplishing the heating (or cooling) of the refrigerant fluid from a single central heating (or cooling) installation which is connected with each of the breather chambers by suitable piping radiating therefrom and back thereto. In the form of construction illustrated in Figures 8 and 9, the refrigerant is confined within tubing coils which act as heat exchangers within their respective chambers. Both forms have the common characteristic, however, of having for their purpose the utilization of the latent heat units present in the piping-contained circulatory fluid, for selectively effecting either a heating or a cooling influence upon a building or equivalent structure to be thermally acted upon.

And the circulatory piping arrangements with their several valve controls appurtenant to the building or equivalent unit, whose thermal conditions the system is designed to selectively influence, are the same, whichever of the offered alternative means of alternately cooling and heating the circulatory fluid, in the course of its described travel through one or the other of the groups of serially connected breather chambers, be resorted to, their fuctional interrelation being the same in either case.

For convenience of reference in subsequent paragraphs hereof, certain of the outstanding component parts of my improved installation and of the building or equivalent structure which it is designed to service will be allotted their respective reference characters: 1, the building or similar unit whose selective heating or cooling is desired, 2, the constant temperature heater whose activity or otherwise is controlled by the burner 3 or equivalent means. Reference character 4 designates the electric wiring system as a whole, 5, the storage or liquid reserve tank 6, which, if desired, may be tapped off from the fluid-circulatory system for quick-freeze or household refrigeration purposes; 7, the booster pump, and 8, any one of the breather chamber units of the group of nine here shown, these being further designated, for operation-sequence purposes, as groups A, B, and C in Figure 1 as well as by subordinately numbered-lettered variants referring to detail parts of each breather chamber. In contrast with this, there are shown in Figure 7 only two such groups, A and B, such a grouping being for use in association with the sequence relays 4r and 4s, in contrast with the operation of the drum switch 3, which is illustrated in detail in Figure 2, and which is the operating and controlling means employed for the assembly shown in Figure 1. Reference characters 9 and 10 designate the thermal-unit-absorbing piping units positioned operatively adjacent to the outer and inner wall surfaces respectively of the building 1, the former for acting coolingly thereupon, the latter, either alone or heat-distributingly aided by radiators 11, for imparting a higher temperature to the interior of the building, or vice-versa. The function of the condenser 2a (Figures 1 and 6) is to dissipate heat units to the constant temperature 2. Reference characters 12 designates the master thermostat within the building 1, connected with the tube 13, and in turn with the master relay 14, whose activation controls the entire wiring system 4.

Three kinds or types of valves are positioned selectively at sundry points within the piping system as a whole; those of the check type will be generally designated as 27, the gate valves are 28, and the automatic expansion valves as 29. In the detailed description of the operation of the entire apparatus herein concerned, the valves of one or another of these types will be allotted lettered modifications of the appropriate numeral, as for example 27a, so that the location of the particular one of that type in the system then referred to may be easily ascertained.

There are thus nine broadly elemental and cooperating structural departments of my invention to be borne in mind: The fluid-enclosing circulatory system, the successively smaller breather chamber units in each of the, as illustrated, three groups A, B, and C, the heater, storage, and refrigeration parts, the various controlling valves of one type or another, the condenser and evaporator units, and the activating electrical (or pneumatic) system. A portion of the circulatory system is of course devoted to interrelating the several parts which act upon the gas or fluid in the circulating piping system to effect its compression or expansion, while other connected parts of the circulatory system, namely those hereinabove allotted the reference characters 9 and 10, are located in operative propinquity to the building or equivalent unit whose selective heating or cooling is desired. Since the gas must first be thermally acted upon as a start toward its to-be-described travel through the containing piping system, the several operative parts devoted to that purpose, roughly constituting the lower two-thirds of Figures 1 and 6 will first be dealt with as much as possible; following that, the delivery of its circulatory fluid to and withdrawal from, the thermal connection pipes on the outer and inner wall surfaces of the building or other unit to be thermally acted upon will be dealt with, both as to themselves and as to their reliance upon, and cooperation with, the strictly fluid-treating and compressing parts. Following that, the organization and functioning of the several parts of the electrical circuit will be covered.

Though, as stated, the entire piping system and its connected parts, are, from a connection standpoint, one, its positioning and functioning divides itself into two parts; the fluid-compression portion and the heat (or cold) delivery portion, that is, the pipings 9 and 10 and their connected parts appurtenant to the building or equivalent structure to be thermally acted upon. For which purpose, heating or cooling, the system functions, is determined by which of the gate valves, 28a to 28h inclusive are selectively opened or closed. Of these the gate valves 28b, 28c, 28e and 28h are left open in the summertime, and similarly the gate valves 28a, 28d, 28f and 28g are open during the low temperature times of the year. And the gate valves 28j and 28k control the possible circulation of the heated fluid through the take-off pipes 24 and 25 respectively, for the delivery of surplus heat units to the constant temperature heater 2. The gate valves 28m control the possible cutting off or the inclusion within the fluid circuit from the constant temperature heater 2 through the auxiliary radiator 11. In either event, heating or cooling, the action of the master thermostat 12 located in the building 1, or equivalent structure, determines the timing and degree of activation of the system when, and in the direction, heating or cooling, desired.

Figure 1:
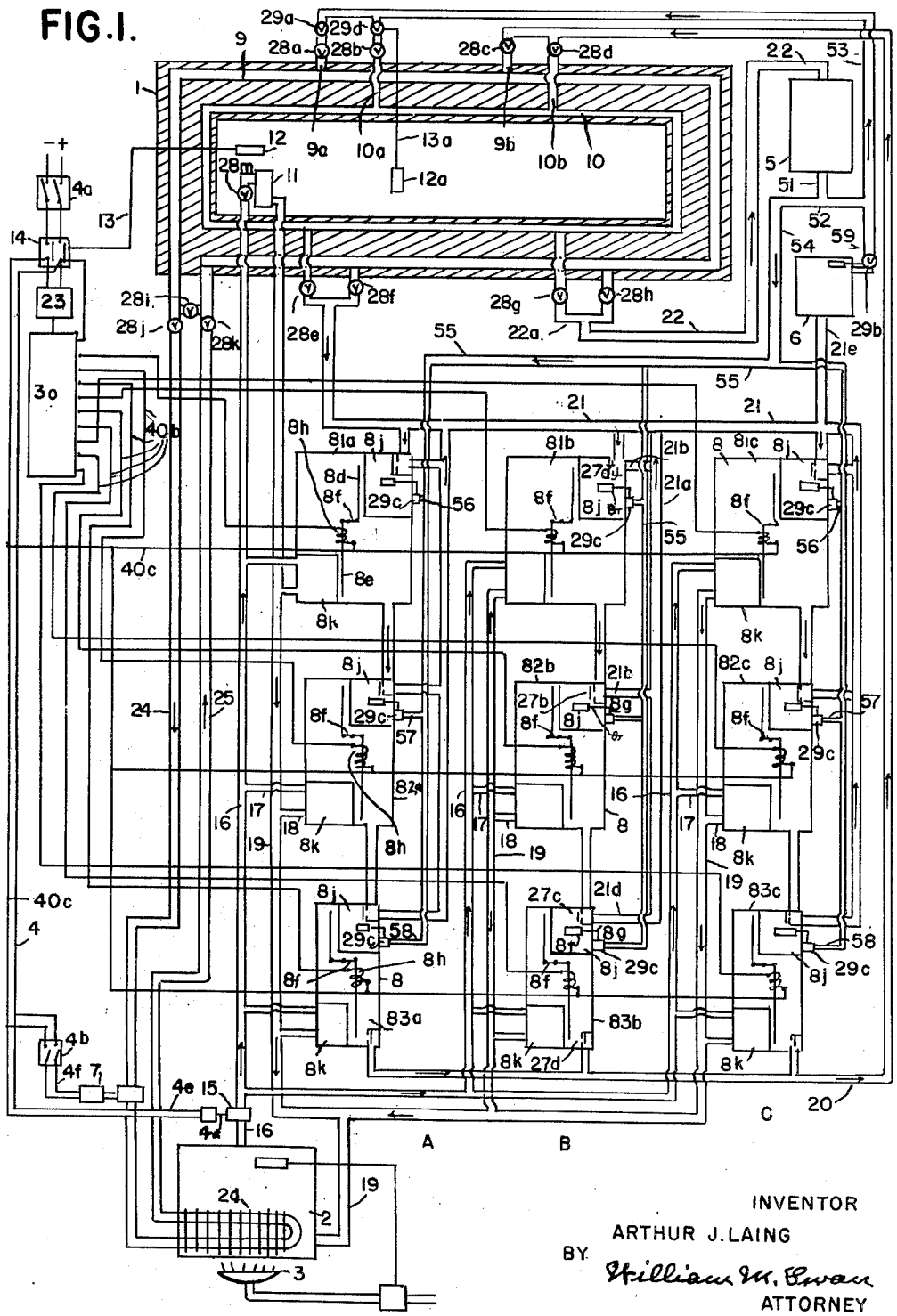
Figure 1 is a diagrammatic view of the piping system and of the several connected parts, such as the heating unit, the system of breather chamber units, liquid storage chamber, refrigerator chamber, and a representation of the building or similar unit to be heated, shown in relation to the activating electrical system and drum switch.
Figure 6:
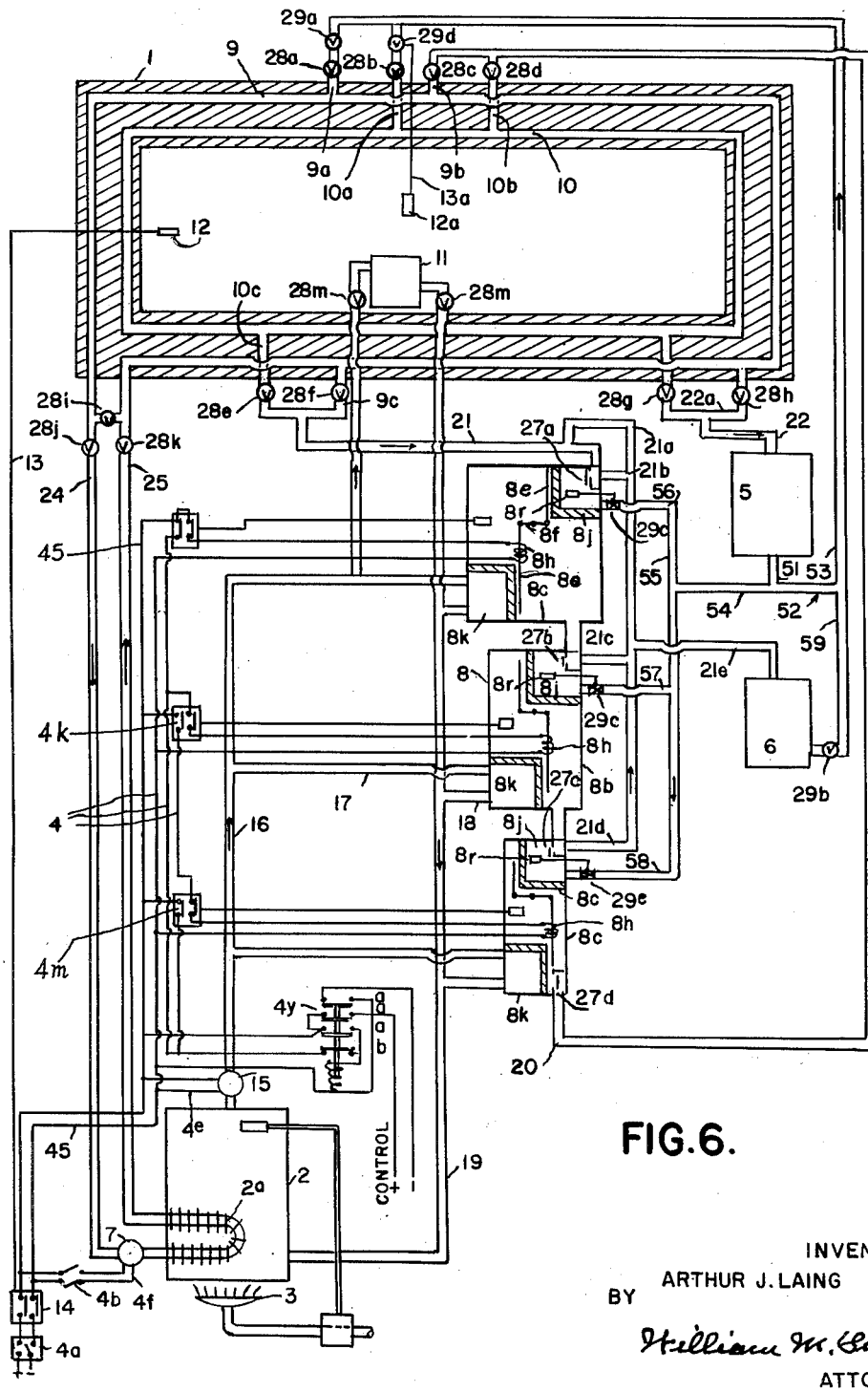
Figure 6 is a diagrammatic view of a similar piping system and its connected parts, including, for the sake of simplicity, only a single group of serially connected breather chamber units, activated by means of sequence relays, instead of by the drum switch shown in Figures 1 and 2.

The initial thermal activation of the piping-system-contained fluid in the (as shown in Figures 1 and 6) lower portion of the piping system is effected by a burner 3 or equivalent means, acting on the constant temperature heater 2. The then heated water is started on its travel throughout the system by the action of a circulating pump 15, preferably electrically activated from the take-off branch 4e of the electrical wiring system 4.

The delivery pipe 16 has leading from it branch pipings, as 17, leading to the louver-controlled heater chamber 8k in each of the breather chamber units 8, whence the water is returned through the several pipes 18 to the common return line 19.

The louver-controlled heater chamber 8k and the louver-controlled cooler chamber 8j in each of the breather chambers 8 are positioned at opposite ends of the latter, and are identical in structure, of which the illustrations herein are more or less conventional and may be modified at will without departure from the intended scope of this disclosure. Positioned between these chambers and operatively connected with each, so that when one chamber is opened and the other is closed, or vice versa, is a solenoid 8h, activated in desired sequence from the general wiring system 4 by means of the wiring from the drum switch 30, as will be hereinafter described in detail.

It should be borne in mind that the heating coil 8n in the heating chamber 8k conducts only heated water supplied from the constant temperature heater 2. Similarly, through the cooling coil 8m in the cooling chamber 8j of each breather chamber passes only the cold refrigerant gas from the liquid receiver 5.

The liquid storage chamber 5 has leading from it pipes 51, 52 and 53, which connect respectively with the cooling pipe system 9, on the outer wall surface of the building 1, and with the piping system 10 appurtenant to the inner wall surface of the building 1 (and also to the refrigerator 6), subject to selective regulation by means of the several valves and branches shown, and also lead to the cooling unit 8j in each breather chamber through the branch pipes 54, 55, 56, 57 and 58. The functioning of these will be dealt with in detail in a subsequent paragraph hereof.

The functioning of any one of the breather chambers 8, either for heating or cooling of the circulatory fluid, is subject to the selective operation of the solenoid 8h in each of the breather chambers, and resultantly of one or the other of the solenoid-activated louver mechanisms 8d or 8e, appurtenant respectively to the cooling unit 8j and the heating unit 8k in each breather chamber, due to the connection at either end of the solenoid with the toggle lever mechanism 8f there shown for opening and closing the louvers. The breather chambers individually and as groups will be first described, it being understood that any desired number of breather chamber units in connected series, as 81, 82 and 83 may be employed, and that any number of groups thereof as A, B, and C, may also be used. It must also be understood that the respectively operative parts within any single breather unit are identical with these in the other breather chamber units, the serially arranged members of any group, as 81, 82 and 83 of either of the series A, B, or C progressively diminishing in size, breather chamber 82 for example being preferably smaller than 81 and breather chamber 83 being preferably smaller than 82, in order that the gas raised to a higher degree of compression in breather chamber 81, from the degree prevailing when admitted into the latter, may then be forced into the next smaller breather chamber 82 with its degree of compression unchanged, due to its first entering the cooling unit 8j in the next smaller breather chamber. It should, however, be borne in mind that any three correspondingly positioned breather chambers in any A, B, or C group, as for example 82a, 82b, and 82c are of the same size in the construction illustrated in the drawings hereof as viewed successively from left to right therein.

Within each cooler unit 8j, in each of the breather chambers 8, is positioned a cooling coil 8m, the entrance of the piping-contained fluid thereinto being controlled by the expansion valve 29c, and a connecting capillary as 8g, from the thermometer-bulb of the thermostat 8r, with which each cooling unit 8j is provided. The fluid enters the coil 8m past the valve 29c in the form of a high-pressure liquid, but the cooling influence due to its passage past the expansion valve 29c results in its change in character to a cold low-pressure vapor, which proceeds through, for example, the connection 21b leading to the common header 21a serving each of the cooler units 8j in each of the breather chambers 81, 82 and 83, and thence to the common evaporator header 21, to be again compressed along with the rest of the fluid in the piping system.

While the circulatory fluid has been undergoing its cooling mission within the cooling chamber 8j, whose solenoid-operated louvers have been opened by the activation of the solenoid 8h, the louvers of the heating chamber 8k have been held in closed position thereby. When the solenoid 8h is de-energized by the action of the drum switch 30, at that point in the cycle of operation, it moves axially lengthwise, thus drawing upon the toggle lever connection 8f to close the louvers 8d of the cooling unit 8j, and to simultaneously draw upon the toggle 8f open the louvers 8e of the heating unit 8k, permitting the circulation of the enclosed reduced-pressure gas around the heating coil 8n therein. This just-described positioning of the open and closed condition of the cooling and heating units, 8j and 8k respectively is shown in enlarged scale in Figure 3.

In the case of the cooling unit 8m of each breather chamber 8, of any size or of any group series, the cooling of the coil is effected by the refrigerating action of the connected liquid receiver unit 5 and its connection with the common evaporator header 21 of the piping system.

In the case of the heating unit 8k of each breather chamber, heat is conducted to the heating coil 8n therein from the constant temperature heater 2, through the circulating pump 15; the circulation of the thus heated fluid being completed through the pipes 16 and 19. In other words, the reference character 19 designates the flow pipe to the constant temperature heater 2, and character 16 designates the companion conducting channel from the constant temperature heater 2. Unless the direction of flow of the refrigerant fluid through these pipes is opposite to one another this being shown in Figures 1 and 6 of the drawings. The flow through one column of the refrigerant fluid would oppose the flow of fluid through the other. Were this not the case, no fluid flow would result and the functioning of the whole organization of parts would consequently be impossible. In which direction such a flow shall take place is regulatable according to the degree of activation of the constant temperature heater 2, a cumulative result of the alternated heating and cooling phases of the cycle in the series of chambers, piping, etc. That is to say, a regulated expansion . . . contraction . . . expansion . . . contraction . . . expansion sequence of the system-contained fluid through the connected-in-series breather chambers without having to resort to the use of a mechanical compressor. Naturally, valves are necessary at certain points of the system for controlling the desired direction of flow of the gas present therein, and its resultant heating (or cooling as may be desired). I am unconcerned as to just what make or size of valves are used; any number of long-on-the-market valves can be selected for this purpose. Similarly, I do not care what make or size of gas or electric heating means is used, the details of the breather chambers used and the cold-element or hot-element louvers, solenoid, circulating pumps, or drum switch used.

It will thus be seen that after fluid present in the breather chamber 81 has been circulated through the heater unit 8k therein; the temperature and consequently the pressure of the gas has been increased, forcing some of the gas initially present in the largest-sized breather chamber 81 into the intermediate-sized breather chamber 82, past the check valve 27b, appurtenant to the breather chamber 81, of any of the groups A, B, or C. Through action of the drum switch 30, the position of the louvers 8d and 8e appurtenant to the cooling unit 8j and of the heating unit 8k respectively have been reversed, resulting in the exertion of a cooling influence upon the breather chamber 81; thus the remaining fluid in the chamber has not only been cooled below its temperature as it stood before its entrance into the breather chamber, but as well has had its pressure reduced below that prevailing in the evaporator header 21, resultantly setting up a suction influence thereupon, the check valve 27a being then opened and permitting gas to flow thereinto from the header 21, and recharging the breather chamber 81 with fluid, thereby completing an operative cycle for that chamber. The same is true as to any breather chamber 8, of any size and in any group.

These breather chambers are herein illustrated as of progressively smaller size as for example 81, 82 and 83 of either of the groups A, B, or C, in order that when the system is in operation an adquate pressure condition of the piping-contained circulatory fluid may be built up by the time that the high-pressure gas emerging from the third and smallest of the breather chambers 83 in each group is released therefrom into the condenser header 20 may have sufficient compressive force to induce a condensing action upon the circulatory fluid within the condenser portion of the system. Under some circumstances, however, the making of all three of the breather chambers as for example 81, 82 and 83, of the same size or even the use of a single breather chamber 8 might be adequate for the use then contemplated, though the induced flow of the circulatory (gas or) liquid through the system would obviously be slower. I desire it to be understood, however, that this variance is to be regarded as more of an engineering question than as an indispensable factor in a patent sense as to how many breather chambers be used or whether the size of the chambers be uniform or of progressively smaller size in each of the lettered groups of three, A, B, or C, as herein illustrated and described.

Of course this disclosure's description of louver control and a cooling (or heating) coil for the cooling and heating units in the several breather chambers is illustrative only of one of several functionally equivalent means which might be employed, as for example, an electrically activated heater in each unit, heating and cooling. This particular alternative, however, might under some circumstances prove objectionable, in that if unregulated an unduly high degree of heat might decompose the circulatory fluid; and an unusually low temperature imparted thereto might result in its condensation within the cooling unit or chamber of its breather chamber.

Under some circumstances the use of a single series-connected group of such breather chamber units, as 81, 82 and 83 might be sufficient for the working of the apparatus. But in order to surely provide against any interruption in the continuity of the induced suction or partial vacuum (or compression) condition within the fluid piping circuit as a whole, I find it preferable to provide a plurality of such groups, A, B, and C, with the operational phase of the constituent breather chambers in each group arranged in staggered or terminally overlapping relation to those of the other series. This is accomplished by the use of a drum switch 30, or equivalent timing mechanism (such as, for example, a relay switch with appropriate wiring), whose contact terminals 41 to 49 inclusive are successively and time-overlappingly engaged by the selectively positioned contact strips 31 to 39 inclusive on the drum's periphery. This is brought out especially in Figure 2, though for the sake of clearness of illustration the representation of the drum's peripheral surface is there shown in plane or flattened-out form, so as to clearly bring out the overlapping positioning of the several contact-strips as selectively arranged about the drum's periphery. Of course when the current is shut off from the drum switch mechanism by the opening of the line control switch 4a which controls the relay 14 all operation of the entire mechanism is brought to an end, either by the opening of the hand switch 4a or by the action of the thermostat 12 upon the master relay 14. And similarly for the sake of clearness, the solenoid 8h in each of the breather chambers is, in this Figure 2, shown in abbreviated-connection position relatively to the showing of the drum switch 30, and to the immediately subjacently shown contact-terminals 41 to 49 inclusive, with the reference character of the particular breather chamber 8 to which each is appurtenant attached thereto.

Figure 2:
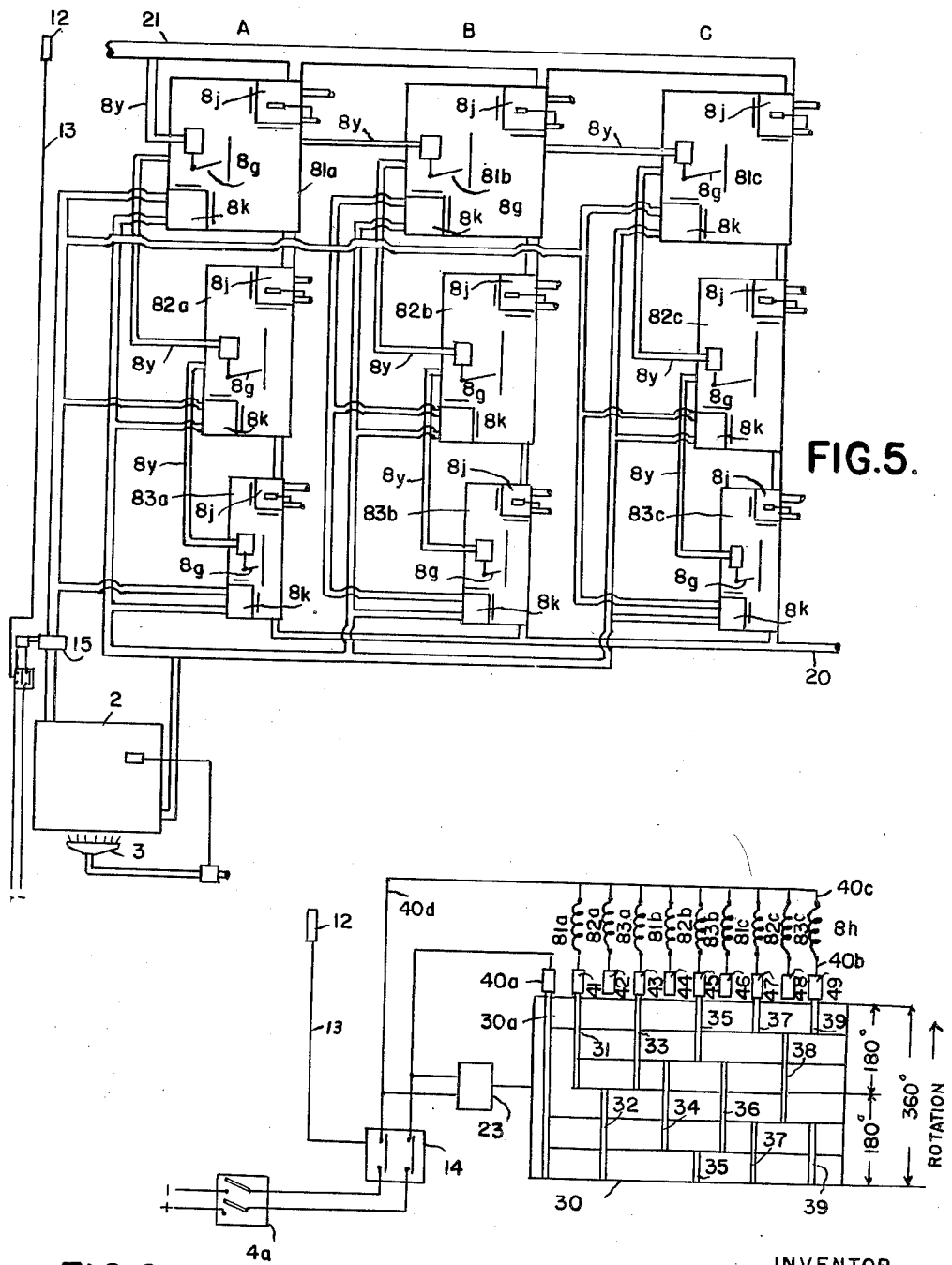
Figure 2 is a diagrammatic view, on a somewhat larger scale than Figure 1, of the drum switch showing the relative position of the contact strips on the periphery thereof.

Referring now to the structural details and operative connections of the drum switch, which is shown in plan or flattened-out form in Figure 2, and elevationally in Figure 1, under the control of the master thermostat 12, in the building 1, the master relay 14 is closed. This in turn activates the timing motor 23, thereby starting the rotation of the drum switch 30 or equivalent mechanism. It will be noted that the contact strip 30a thereon is completely peripheral of the drum and connected with all of the partly peripheral contact strips 31 to 39 inclusive, whereas the other contact strips, 31 to 39 both inclusive, extend only partially thereabout, namely 180°, though overlappingly of one another in each of the three groups, as for example 31, 34 and 37 of the group serving the initial or largest breather chamber 81 in each group; similarly, strips 32, 35 and 38 terminally overlap one another, since they serve each of the breather chambers 82 in each of the serially connected breather chamber groups; likewise, the contact strips 33, 36 and 39 serve the smallest of the breather chamber units 83 in each of the groups 8a, 8b and 8c.

The activation of the master relay 14 energizes the timing motor 23 and also the completely peripheral contact strip 30a through the contact brush 40a. Similarly as the partly peripheral contact strips successively engage their respective contact brushes 41 to 49 inclusive, each energizes with the same polarity as the peripheral contact strip 30a one side of its corresponding solenoid 8h in its corresponding breather chambers 81a, 82a and 83a being energized in successive sequence and similarly the chambers 81b, 82b and 83b, and the chambers 81c, 82c and 83c. The other side of each of the solenoids 8h is commonly connected by the wire 40c with the common wire 40d to the opposite polarity to that of the completely peripheral contact strip 30a.

Thanks to the staggered or overlapped positioning of the contact strips 31 to 39 inclusive about the surface of the drum, the activation of the solenoids in each of the breather chambers 8, and consequently the timing of the operative activity of the cooler chamber 8j and of the heater chamber 8k in each of them is made to overlap, so that at no time in the operational activity of the system as a whole is there any cessation of the induced partial vacuum (or compression) condition therein.

Now, turning to the building 1, whose heating (or cooling) is desired, the reference characters 9 and 10 have already been used to respectively designate the heat-transmitting piping operatively adjacent the outer wall surfaces and the cooling piping appurtenant the inner wall surfaces; and 11 represents an auxiliary radiator, as many of which as are desired may be used to distribute heat within the building, as in severe weather conditions. When the wiring circuit 4 is energized by operation of hand switch 4a, the thermostat 12 will of course act. With the thermostat thus activated, it responds to its adjustment and to the then prevailing temperature conditions within the building, and activates the gas-compressing parts.

There are four points of main piping connection between the pipes 9 and 10, which encircle the building: The condenser header 20 leading the freshly heated and compressed fluid from the thermally-activated breather chambers to the outer and inner wall piping 9 and 10 respectively, and the return pipe 21 leading back to the breathers, thus, subject to the valve-controlled take-offs therefrom, later to be described, constituting a continuous circulatory system for the compressible and expandable refrigerating gas. It should be borne in mind that the circulatory fluid which at any time passes through either the outer wall piping 9 or through the inner wall piping 10 is always in the form of gas or a foglike vapor.

The pipes 24 and 25, guarded by the gate valves 28j, 28k illustrate the possibility of utilizing solar or other waste heat, by conducting the fluid through the booster pump 7, through the constant temperature heater 2, thus helping to raise the temperature in the constant temperature heater 2 to an operative degree. The booster pump 7 is activated through the master relay 14 and the hand controlled switches 4a and 4b. The booster pump 7 only serves to circulate the heated medium within the constant temperature heater 2 through the heat exchanger 2a. The booster pump 7 is activated electrically, through the medium of the branch or take-off circuit 4f and the circulating pump 15 by the take-off circuit 4e.

Pipings 9 and 10, constituting the evaporator or condenser members, lead the condensed liquid through the header 22a and pipes 22 back to the liquid receiver or storage tank.

At the extreme top of Figures 1 and 6 are shown four plurally branched valve-controlled take-off pipings, as 9a and 10a and 9b and 10b, each of which is valve controlled; The gate valve 28a controls the entrance of cold vapor which has gone through the expansion valve 29a into the exterior piping 9. The gate valve 28b controls the entrance of cold vapor into the inner wall piping 10 which has similarly gone through the expansion valve 29d, subject to the control of the thermostat 12a to which the connection 13a leads, to regulate the degree of cooling influence of the system upon the interior of the building in the summertime. Suffice it to say, at this point, that when the gate valve controlling any one of the longer take-offs is closed, the valve controlling the companion shorter leg is open, and vice versa.

Fluid passing beyond the expansion valve 29a in the form of high-pressure liquid is then changed to a cold low-pressure vapor or gas, which proceeds into either the outer piping 9 or the inner wall piping 10, according to whether the cooling of the building or heat-absorption from an outside source is desired. In winter, the flow of the circulating fluid will be through the outer piping 9, to absorb the heat of evaporation from the outside atmosphere or other external medium; in summer, the flow of the fluid is through the inner wall piping system 10 to absorb the excess heat from the interior of the building.

The gate valve 28c controls the entrance of compressed heated fluid entering the outer wall piping 9 from the condensing header 20. The gate valve 28d exercises a similar control over the flow of the heated fluid into the inner wall piping 10.

The gate valve 28e controls the suction from the inner wall piping 10, into the header 21. The gate valve 28f performs the same function as to the outer wall piping 9.

The gate valve 28g controls the flow of condensed liquid from the inner wall piping 10 to the header 22a and 22 which leads back to the liquid receiver 5. The gate valve 28h exercises similar control over the flow of condensed liquid from the outer wall piping 9.

The gate valve 28j controls the flow of waste heat to the constant temperature heater chamber 2, through the heat-exchanger 2a therein, in the form of solar heat or exhaust waste heat from sources such as exhaust steam or flue gas.

The gate valve 28k controls the flow from the constant temperature heater back to the waste heat system, and the gate valve 28m controls the access of heated fluid to the auxiliary radiator 11 in the building 1.

The gate valve 28i controls the closure of the outer wall piping system in case of the booster system not being in operation.

Also leading from connection with the main liquid line 51 to the headers or branches is a branch 54 leading to connection with the header 55, which continues as branches 56, 57, and 58, to serve the respective cooler units 8j in each breather chamber unit, subject to control by the expansion valves 29c. From the cooler units 8j in each of the breather chambers 8, branch pipes 21b, 21c and 21d severally lead into the connection 21a to the common evaporator header 21.

A branch-off pipe 59 from the liquid receiver header 52 leads to the refrigerator 6, through valve 29b and from the refrigerator through the pipe 21e to the evaporator header 21a, and thence through the breather chamber system, which latter compresses and heats the fluid proceeding to one or the other of the piping system 9 or 10, according to whether heating or the cooling of the building 1 is desired.

With the several component and cooperating parts of the system, or their fair equivalents, thus organized, and with the understanding that a sequence relay and appropriate wiring connections, or pneumatic control, may be substituted for the drum switch activating and timing means without departure from the intended scope hereof, it should be again emphasized at this point that the outstanding idea, the core, about which the thus organized mechanisms is centered is the utilization of the latent heat present in whatever medium it is absorbed from that compression is accomplished by action upon the circulatory fluid by a succession of breather chambers which are alternately heated or cooled.

The first step in the activation of the system of course consists in closing the hand-operated switch 4a, to energize the electrical system 4, and setting the master thermostat 12 in the building 1 at the desired thermal reading; this impulse is transmitted through pipe or tube 13 to and from the master thermal relay 14. The heated fluid in that part of the piping circuit then immediately subject to heating within the constant temperature heaters 2, because of the action of the burner 3 thereupon, is then started on its way through the action of the circulating pump 15, and through the outflow pipe 16 is circulated through each of the various heater units 8k of the breather chambers and thence returned to the heater unit 2 through the pipe 19.

The direction of flow of the circulatory fluid through the pipes 9 or 10 appurtenant to the building is determined by whether an heating or a cooling influence upon the building 1 is desired; and this in turn is regulated, as already described, by the setting of the master thermostat 12 within the building 1, and in the summertime also by the auxiliary thermostat 12a.

Coincidentally with the start of the flow of the liquid through the piping system, the circuit controlling the drum switch 30 is closed by the hand switch 4a and relay 14, starting its activation. The proper rotative speed of the drum switch depends upon the time period required for the heating units and for the cooling units in the several breather chambers 8 to complete the cycle of their respective functions. Once a complete rotative cycle of the drum switch 30 has been gone through with, the heating and cooling of the fluid at any time present in any breather chamber proceeds in regulated overlapping sequence, thanks to the staggered or partly overlapping arrangement of the partly peripheral contact strips 31 to 39 inclusive on the drum switch 30. When the imparted heat, or cold, has attained the degree at which the master thermostat 12 in the building 1 as set is satisfied, further action of the pump 15 upon the circulatory system is then ended, and consequently the alternated cooling and heating of the circulatory fluid in the breather chambers 8 is brought to an end.

Figure 3:
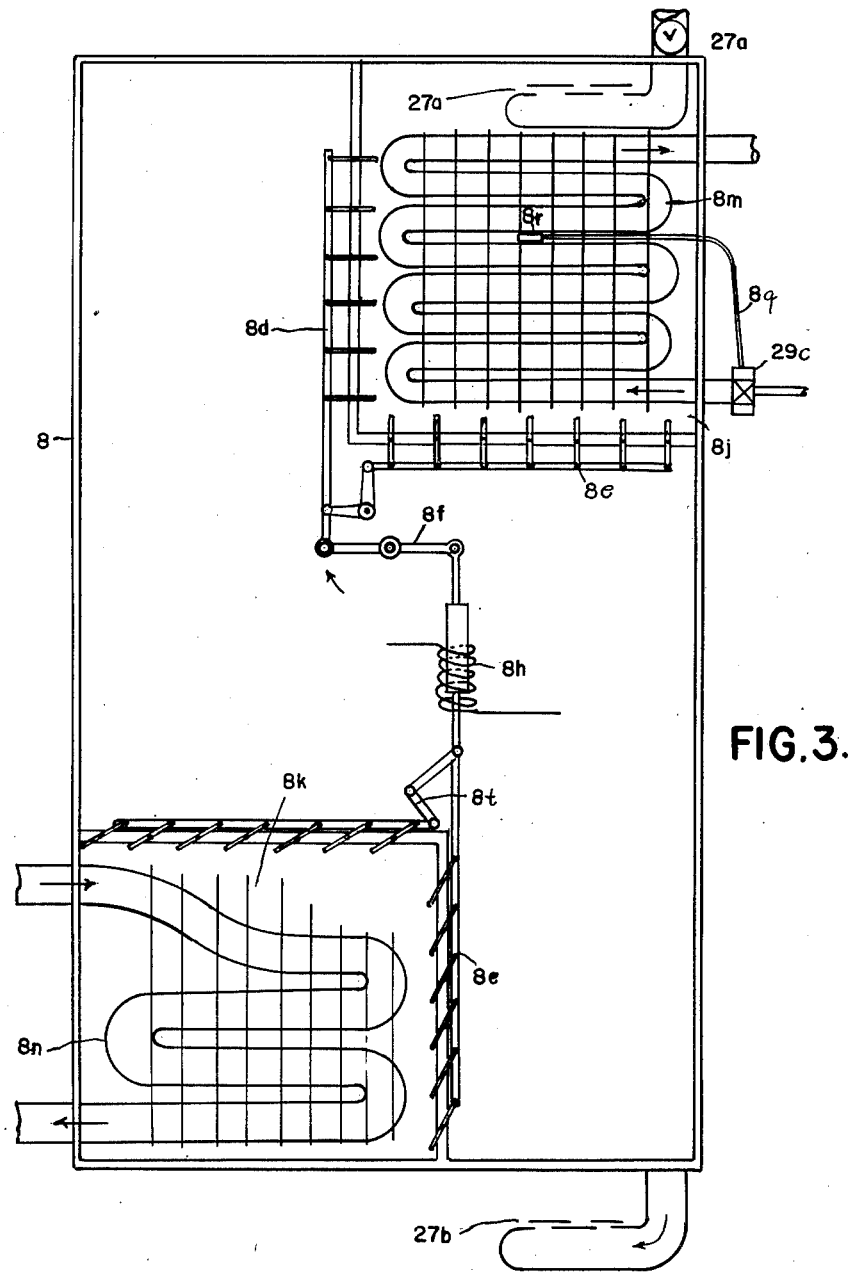
Figure 3 is a larger scale diagrammatic showing of the interior details of each breather chamber unit, whatever its size in the group thereof used.

The showing of the details of a breather chamber 8 in Figure 4 differs from the construction shown in Figures 1, 2 and 3 only in the substitution for an activating solenoid, as 8h in those figures, of a bellows 8x or equivalent pneumatic control means, for the activation of its louver-controlling link and lever mechanism. Upon the engagement of the stud 8p by one or the other of the branches, as 8s and 8t, of the terminally bifurcated lever 8w, which is pivotally supported intermediate its ends, as at 8u, with its opposite end pivotally connected to the stem 8v of the bellows 8x, or equivalent pneumatic mechanism, such as a cylinder-contained piston, the bellows (or piston) is acted upon either pressingly or suctionally according to the pressure (or suction) influence exerted upon it through the pipe 8y, which connected with that enclosure, piping or breather chamber, whose differential in pressure regulates the sequence of operation as between, for example, the breather chamber 81a and the header 21 or between the breather chamber 81a and 81b, or between 81a and 82a, or between 82a and 83a. The outward thrust of the piston of the bellows 8x and its stem 8v is yieldingly opposed, to insure its prompt retractive movement, by the spring 8z.

In Figure 7, as already mentioned, there is shown diagrammatically a pair only of breather chamber groups, of successively diminishing size, and connected in series, which are to be activated by a sequence relay instead of the drum switch already explained as to the other figures of drawing. Similarly, the use of a single breather chamber connected with the headers 21 and 20 of the circulatory piping system might, under some circumstances, be resorted to.

In this Figure 7, two-pole thermostatic or pressure switches 4j, 4k, 4m, 4n, 4p and 4q, each operated by an appurtenant thermostat bulb, are tied in by appropriate wiring with the general electrical circuit 4. One pole of each switch is normally closed, with the corresponding pole of each normally open. The normally closed side of each switch is connected to the solenoid 8h in each breather chamber 81. In the case of the thermostatic switch 4j the normally open side energizes the closed side of the thermostatic switch 4k and also the sequence relay 4r; and the normally closed side of the thermostatic switch 4k energizes its corresponding solenoid 8h by the activation of its corresponding thermostatic bulb in the breather chamber 82; this holds true as to the activation of all of the breather chambers in the series.

The sequence relays 4r and 4s have four sets of contacts. The bottom set of each is a normally closed "b contact," while the other three sets are normally open "a contacts." By the activation of the thermostatic switch 4j, current is brought through the solenoid coil of the sequence relay 4r through its "b contact," and when the relay operates, it is sealed in by the next "a contact," which keeps it in service until the whole system is through with its period of operation, that is, until the master relay 14 disconnects this circuit from the activating circuit.

The next two "a contacts" serve to energize the control circuit which activates the next group of breather chambers. Each group of breather chambers has an identical set of thermostatic switches and sequence relays, which carry the sequence of operation similarly to the drum switch operation of the breather chambers for which this relay switch construction is suggested and here explained as an entirely usable alternative.

Again it should be emphasized, for the sake of clarity, that such activating electrical means as a drum switch or a relay mechanism or pneumatic control are here dealt with only as necessary operative elements for the selectively cooling and/or heating herein disclosed. Any suitable commercial type thereof may be employed.

In extremes of temperature, either low outside the building or equivalent structure or high therewithin, the starting up of the system herein dealt with is cared for by the already described action of the thermostat 12, subject to its proper setting for the degree of temperature desired. In the case of such mild temperature conditions as are expectable during the spring and the fall of the year, the apparatus could be started by bleeding of the excess pressure prevailing in the evaporator or by positioning of a pressure switch between the evaporator and condenser. For restoring activation however, it would only be necessary to pump the fluid in the evaporator to the condenser until an operative differential is established by means of a portable mechanical compressor or the like, to create the differential in pressure necessary for the cooling coils 8m to function.

Figure 8 is a diagrammatic showing of a slightly modified construction embodying the use of a plurality of breather chambers varying in construction though not in basic principle from the construction shown in the figures of drawing already dealt with, in that the refrigerant is confined in a piping system, portions of which, guarded by check valves directing the flow of the fluid, act as heat exchangers, being in the stream of an alternately heated and cooled fluid, impressing the thermal influence necessary to expand and contract the refrigerant, thereby compressing the contained fluid through the breather chamber action, heretofore described.

Instead of the three groups of breather chambers, having three chambers in each group as elsewhere herein shown and described, Figure 8 shows two groups of four chambers each, 61a, 62a, 63a, 64a and 61b, 62b, 63b and 64b. A single heating unit 8kk and a single cooling unit 8jj for the entire system is substituted for the individual heating unit 8k and cooling unit 8j in each one of the breather chambers dealt with in the other figures of drawing. Also, the peripheral contact strips on the drum switch 30aa are changed to accommodate the two groups of breather chambers, of four each. Four peripheral contact strips of 180° each control the activity of each group in their successive operation, with overlapping sequences of 45° of one group as contrasted with the positionings of the other group.

Four thermal-influencing header pipes 71, 72, 73, and 74, are shown for delivering the heating influence from the heating unit 8kk to the several breather chambers 61a, 62a, 63a and 64a and 61b, 62b, 63b and 64b and back to the cooling unit 8jj thus delivering the cooling influence from the cooling unit 8jj to the several breather chambers and back to the heating unit 8kk.

A fan 15aa is used for initiating the flow of the thermal-influencing fluid through the entire system. Cooling unit 8jj is connected with pipes 53aa and evaporator header 21aa, said cooling unit having a construction similar to the hereinbefore described cooling unit 8j in each of the breather chambers. The heating unit 8kk is connected to pipes 16aa and 19aa, and is similar in construction to any one of the heating units 8k, although the louver control is omitted from the showing of these units in Figure 8. The circulating pump 15 is unnecessary for the reason that a single unit is served by the constant temperature heater instead of the several heating units in the several breather chambers as illustrated in Figure 1.

The serial and parallel connections of the breather chambers in Figure 8 are shown as continuations of the pipes 20 and 21 in Figure 1.

Figure 9 is an enlarged view of the single breather chambers shown in Figure 8.

Louvers 91, 92, 93 and 94 are shown at the intake and outlet parts controlling the flow of the thermal-influencing fluid past the heat exchanger and directing the flow from the heating unit discharge header 73 through the chamber and thence to the cooling unit intake header 74, thence from the cooling unit discharge header 71 through the chamber, and thence to the heating unit intake header 72. The solenoid 95 is shown as operating from the drum switch 30aa to activate the four sets of louvers which act in successive periods to direct the heating and cooling influence past the heat exchanger.

The heat exchangers 61a, 62a, 63a and 64a in successive stages of the groups are of progressively smaller capacity as is described in Figure 1. The heat exchanger 65 illustrated in Figure 9 functions as a pre-cooler, which is kept in the constant stream of fluid, and thence from the cooler unit discharge header 71 leading to the heating unit intake header 72.

To further illustrate the action of the system shown in Figure 8, the fan 15aa starts the flow of the cooling fluid from the cooling unit 8jj through the header 71 to each of the breather chambers. Through the action of the drum switch 30aa all chambers are alternately heated and cooled by the operation of the solenoids 95 and louvers 91, 92, 93 and 94 in the individual chambers. If, for example, the louver in the chamber 61a admits cooling fluid, the chambers, 63a, 62b and 64b are likewise in the same part of their cycles. And the breather chambers 62a, 64a, 61b and 63b are in the heating part of the cycle. The temperature of the cooling fluid is raised after passing through the coil 65a of the breather chamber, and it is thence exhausted into the duct 72 and thence proceeds back to the heating unit 8kk. The temperature is then again raised and it passes into duct 73 to the chambers which are in the heating part of the cycle. After passing the chamber coils 65a, the fluid is cooled and discharged into the duct 74 and thence returns to the cooling unit 8jj and is there further cooled. Thus, the circuit is completed and the refrigerant in the coils 65a is alternately cooled and heated and the resultant expansion and contraction of the circulatory fluid is trapped by the valves 27aa, creating a suction condition in the header 21 and a pressure to be built up in the header 20aa. As the pre-cooler 65 is always in the cooling fluid stream it tends to reduce the pressure of the fluid upon its admittance to each breather chamber.

It will be noted that in Figure 8 no attempt has been made to include therein any representation of the building or similar structure which is to be thermally acted upon, either heatingly or coolingly. This has seemed unnecessary, for the reason that the broken-off showings in this figure of the condenser and evaporator headers 20aa and 21aa respectively, tie in with the remaining portions of the piping system particularly appurtenant to the building 1 in exactly the same manner as do the condenser header 20 and the evaporator header 21 in Figures 1 and 6.

To sum up, and referring particularly to Figure 6 of the drawings, after the system is charged with the selected refrigerant, the heating unit 2 is activated to the desired working temperature by a gas flame, or by solar heat, or by other equivalent waste heat, such as flue temperature.

In case the structure is to be cooled, the valve 28c is opened and valve 28d is closed. Since the pipe 20 is a part of the refrigerant circuit leading to pipe 9 acting as the condenser in this case, condensation occurs in this case as the heat is given off, and the liquid refrigerant is led past the valve 28h to the pipes 22a and 22 and thence to the liquid receiver 5.

The pipes 51, 52 and 53 conduct the liquid refrigerant past the now open valve 29d and expansion valve 28b; from there the cooled vapor proceeds into the pipes 10a and 10, whose function is to exert a cooling influence on the inside of the structure and thence through the pipe 10c and past the valve 28e to the pipe 21 on the suction side of the group of compression chambers 8a, 8b and 8c; this completes the refrigerating cycle.

In case a heating effect is desired on the structure, the valves 28c and 28h are first closed, and the valves 28d and 28g are opened, leaving the pipe 19 free to act as a condenser upon the vaporized refrigerant fluid. The pipe 53 conducts the liquid refrigerant to the pipe 9, the control valves 29d and 28g being closed and the control valves 29a and 28a being open, which described positions of these valves cause the pipe 9, appurtenant to the outside of the structure, to serve the evaporator portion of the refrigerating circuit.

The pipes 24 and 25, by the passage of the refrigerant fluid through them, serve to raise the temperature of the fluid acted upon by the heater 2 by utilizing solar or other surplus heat. The valves 28j and 29k are open, while the by-pass valve 28i is closed.

Again referring to Figure 6, the water, whose temperature has been raised by the heater 2, is activated, through the pipes 16 and 17 by the pump 15 to the heating element 8k and returned back to the vicinity of the heater 2 through the pipes 18 and 19. This action upon the chamber 8b is duplicated, by parallel connected pipes 17 leading to the heating element 8k and pipes 18 away from it, to the chambers 8a and 8c. This servicing in parallel of the three groups of chambers 8a, 8b, and 8c is brought out further in Figure 1.

The functioning of the arranged-in-series groups of breather units 8a, 8b and 8c, under either heating or cooling conditions of the system, having been already covered, it seems unnecessary to here again review the details of their functioning.

Although, in the text hereof, sundry of the operative parts and their functioning, as for example the structural unit to be thermally influenced, the primary heater, the condenser, the liquid receiver expansion valve, and the evaporator, are dealt with and elementally included in certain of the claims, they, in and of themselves, are admittedly old, and are here introduced structurally only for the purpose of emphasizing the definitely novel results obtainable from the combinative association with them of the breather chamber units and system hereinafter to be dealt with in detail as such.

To sum up the cooperative and sequential functioning of the above-described parts, the following time schedule or performance cycle of my invention is here set forth:

1. System is charged and at rest.
2. Liquid is in receiver and gas in condenser, evaporator, and breather.
3. Heat is applied to all breathers by opening heat louvers.
4. Gas is expanded in all breathers forcing same gas into condenser.
5. At the proper high temperature, cooler louvers are opened and heater louvers are closed causing partial vacuum in breathers and drawing some gas from evaporator to first stage.
6. Gas admitted to first stage in a cold stage which allows maximum expansion: maximum volume of gas if forced into second stage and maximum vacuum applied to evaporator.
7. Second stage admits gas through cooler hastening the cycle of performance.
8. Second stage is heated forcing gas to third stage.
9. Gas is cooled as it enters, and the action is

FIRST STAGE

| 1 | 2 | 3 |
|---|---|---|
| cool gas admitted | heated, forced out | cooled, cool gas admitted |

SECOND STAGE

| | | |
|---|---|---|
| gas admitted through cooler | heated, forced out | cooled, creating vacuum |

THIRD STAGE

| | | |
|---|---|---|
| hot gas admitted through cooler | heated, gas forced out | cooled, creating vacuum | repeated through successive stages until condensing pressure is built up in the condenser.

What I claim is:

1. In combination with a piping system certain of whose parts are located in thermally-operative propinquity to an external structure whose selective heating or cooling is sought, a liquid storage unit, a constant temperature water-heating unit, a plurality of groups of breather chambers each connected in series with said piping system and in parallel and as regards the component units of each group, a plurality of valves positioned at selected points in said piping system and said breather chamber groups according to the heating or cooling influence at any operative time to be exerted upon said external structure, thermostats operatively appurtenant to said external structure, and an activating electrical circuit connected with the several thermostats and with selected parts of the operating mechanism within each of said breather chambers.

2. In a mechanism for selectively imparting thermal influence within predetermined thermal extremes upon a structural unit, the combination of a piping system part of which is located in operative propinquity to such unit, a liquid storage member, and a heating unit operatively connected therewith, a group of plurally-membered breather chambers each connected in series with selected parts of said piping system, each of said chambers being provided with means for cumulatively exercising a thermal and pressure influence upon the piping-enclosed fluid, proceeding thereinto from the evaporator portions of the piping system and emerging therefrom into the condenser portions of said piping system, a thermostat positioned within the unit to be thermally influenced, valves positioned at selected points in the piping system and in the connections between the breather chambers, the opened or closed condition of each of said valves being determined by the character of the thermal influence desired to be imparted to the structural unit, and an activating electrical circuit for said thermostats and for the mechanism contained in the breather chambers.

3. A breather type gas compressor installation for selectively influencing the temperature of a structural unit, comprising, in combination with a fluid-containing piping system, a liquid storage chamber, an evaporator portion, a condenser portion, a heating unit, an activating electrical circuit, valve members for regulating the degree and the direction of flow of the fluid within the piping system according to the selective call thereupon for the delivery of thermal units in operative propinquity to the structure to be serviced, a plurality of groups of breather chamber units arranged in series connection with said piping system whereby the contained fluid is alternately compressed and cooled to vacuum-creating degree, and means activated by said electrical circuit whereby the timing of the operative phase of each of said breather chamber units is regulated for the selective maintenance of a pressure and of a partial vacuum within said piping system and its connected units.

4. Means for effecting the compression of a piping-enclosed refrigerant, comprising, in combination with such a piping system a portion of which is located in operative propinquity to a structure to be thermally acted upon, a series of breather chambers of progressively smaller size connected with said piping system and with one another, means located in operable propinquity to each of said breather chambers whereby the refrigerant fluid passing therethrough may be regulatedly and alternately cooled for a suction action and heated for an expansion action, means for controlling the timed activation of the cooling means and of the heating means in influencing each of the breather chambers, means for effecting an opposite thermal influence in adjacent chambers in the series, check valves positioned at selected points along the thus-constituted refrigerant-filled circuit whereby accumulated pressure within the piping system and breather chambers is trapped to insure the movement of the fluid in its course to the succeeding breather chamber and to prevent the counter flow thereof to the preceding breather chamber, a master thermostat positioned within the structure for regulating the activity or otherwise of the system, an external source of activating power with which certain of the movable parts contained in the system are operatively connected, means connected with said source of power and with the activating means within each of the breather chambers whereby they are successively operated in timed sequence, and means for initiating the flow of fluid through the interconnected system.

5. A breather type gas compressor installation for selectively influencing the thermal condition of a structural unit, comprising, in combination with a condenser, a liquid receiver, an expansion valve, and an evaporator, a plurality of groups of breather chamber units of progressively diminishing size in each group, all connected in series with one another within their respective groups, check valves positioned on either side of each individual breather-chamber, said groups of breather chamber units being parallel-connected with one another in the system as a whole.

6. A breather chamber construction for the exertion of a compressive action upon a circulatory fluid mass introduced thereinto, comprising, in combination with an enclosing shell provided with valve-controlled inlet and outlet apertures for advancing the fluid flow through such chamber, spacedly positioned cooling and heating units located in operative propinquity to the chamber, said cooling means being adapted to act upon the circulatory fluid as it enters the chamber, means for regulating the operating phases of activity of said cooling and heating means operatively connected with the controls for said cooling means and said heating means respectively, whereby one of them is rendered inactive contemporaneously with the operative activity of the other, and vice versa, and means connected with an externally located activating medium whereby the duration and timing of the operative activity of such last recited parts is properly synchronised with their respective influence on the contained fluid within the chamber.

ARTHUR J. LAING.

REFERENCES CITED

The following references are of record in the file of this patent:

UNITED STATES PATENTS

| Number | Name | Date |
| --- | --- | --- |
| 653,171 | Coleman | July 3, 1900 |
| 1,776,919 | Hulse | Sept. 30, 1930 |
| 1,885,793 | Bailey | Nov. 1, 1932 |
| 2,004,503 | Hulse | June 11, 1935 |
| 2,241,070 | McLenegan | May 6, 1941 |
| 2,257,540 | Smellie | Sept. 30, 1941 |